United States Patent Office 2,698,255
Patented Dec. 28, 1954

2,698,255
STARCH COMPOSITION

Peter Kass, Wilmington, Del., assignor to Atlas Powder Company, Wilmington, Del., a corporation of Delaware No Drawing. Application January 11, 1951, Serial No. 205,600

4 Claims. (Cl. 106—213)

This invention relates to starch compositions and more particularly to aqueous starch pastes.

It has for its principal object the production of starch compositions which when formed into aqueous paste have greatly reduced viscosity over pastes of like concentration of the starch itself.

Another object is the production of such starch pastes of reduced viscosity.

The above and other objects will become apparent in the course of the following description and the appended claims.

In certain commercial applications of starch, notably in the sizing of paper, it is desirable to prepare starch pastes of relatively high solids content and low viscosity in order that suitable quantities of the size material may be added to the paper without introducing excessive quantities of water. Many methods of modifying starch in such manner that its pastes will be of abnormally low viscosity have been proposed, which methods include oxidation, chlorination, acid treatment, and enzymatic attack. By such modification, the viscosities of starch pastes are reduced but the chemical nature of the starch itself is also altered, frequently in a direction detrimental to the purpose for which it is being applied.

According to the present invention starch compositions which disperse in water to yield pastes of lowered viscosity are prepared by incorporating therein small proportions of fatty alcohols. The said alcohols may be incorporated in the dry starch to form a composition which disperses on heating with water to form pastes of lowered viscosity or may be added as a separate ingredient to the vessel in which the paste is being formed. In any case it is preferred that the fatty alcohol be added before the starch granules are fully swollen in the pasting operation.

The fatty alcohols employed according to the present invention are straight chain monohydric alcohols containing from 10 to 14 carbon atoms. Specific alcohols within this group are decyl, dodecyl, tetradecyl, dodecenyl, tetradecenyl alcohols, and the like. For reasons of availability, the preferred alcohol for the practice of this invention is lauryl alcohol.

The proportions of aliphatic alcohol to starch to be employed depend upon the extent of viscosity reduction required for the particular starch application at hand. In general, however, it will be found desirable to employ not more than 10% of the alcohol based on the weight of dry starch and it is preferred to use not more than 5%. Very small addition of the alcohols, that is as little as 0.1% based on the dry weight of the starch, produce perceptible decreases in paste viscosity although the more useful, and therefore preferred, amounts range from 1% upwards.

By way of illustrating the extent to which the aliphatic alcohols reduce the viscosity of starch paste the following experiment was carried out. Aqueous starch slurries containing 7% of starch and 7% starch plus 0.14% commercial lauryl alcohol, respectively, were prepared. The vessels containing the slurries were immersed in a water bath at 95° C. for 21 minutes, the contents of each being agitated continuously. The agitators were removed and the vessels tightly capped and allowed to cool to room temperature overnight. The cooled vessels and contents were brought to 25° C. by immersion in a thermostat at that temperature for an hour, the resulting pastes were agitated for 5 minutes with a mechanical stirrer, and their apparent viscosities immediately determined with a viscometer of the revolving spindle type. The apparent viscosity of the control paste (no lauryl alcohol added) was 6,200 centipoises while that of the test sample was 1,900 centipoises. The reduction in apparent viscosity was thus 69.4%.

Similar results are obtained if the other alcohols named hereinbefore are substituted for the lauryl alcohol in the above experiment and the extent of the reduction in viscosity may be controlled by varying the concentration of alcohol as described above.

A composition illustrating the preferred embodiment of the invention may be prepared by introducing 100 parts by weight of powdered cornstarch into an upwardly inclined rotating cylindrical container fitted with baffle plates whereby the contents are tumbled, and spraying into the tumbling starch 2 parts by weight of molten lauryl alcohol. Tumbling is continued until the added alcohol is thoroughly dispersed and uniformly incorporated in the starch. When the said composition is made into a starch paste by dispersing in water and heating in the usual manner, the resulting paste on cooling and ageing has very much lower viscosity than a paste of comparable starch content made in the absence of lauryl alcohol.

Aqueous starch pastes made in accordance with the present invention may contain ingredients other than starch, water and aliphatic alcohol, as dictated by the use to which the paste is to be put. Thus, the paste may contain dispersed oil or tallow for lubrication in textile size, or wax as an ironing aid in laundering, or suspended clay or pigment for paper coating and sizing, or hygroscopic salts for retaining moisture in films produced from starch pastes, and the like.

It is recognized that certain nonionic emulsifying agents, notably the mono fatty acid esters of polyethylene glycols are very effective in decreasing the viscosity of starch pastes. The alcohols employed in the present invention are not emulsifying agents and can be employed as starch viscosity depressants where it may be desired not to include an efficient surface active agent.

The invention having been described and its utility indicated, what is claimed is:

1. A starch composition comprising starch and from about 1% to about 5%, based on the weight of starch, of a straight chain, monohydric aliphatic alcohol containing from 10 to 14 carbon atoms.

2. A starch composition comprising starch and from about 1% to about 5%, based on the weight of starch, of lauryl alcohol.

3. An aqueous starch paste comprising starch, water and from about 1% to about 5% based on the weight of starch of a straight chain monohydric aliphatic alcohol containing from 10 to 14 carbon atoms.

4. An aqueous starch paste comprising starch, water, and from about 1% to about 5% based on the weight of starch of lauryl alcohol.

References Cited in the file of this patent

UNITED STATES PATENTS

| Number | Name | Date |
| --- | --- | --- |
| 2,212,557 | Bauer | Aug. 27, 1940 |
| 2,221,933 | Eitelman et al. | Nov. 19, 1940 |
| 2,534,008 | Fiero | Dec. 12, 1950 |

FOREIGN PATENTS

| Number | Country | Date |
| --- | --- | --- |
| 629,646 | Germany | May 11, 1936 |

OTHER REFERENCES

Chemical Abstract, 3rd Dec. Index A–D, pages 4623–4624.